Jan. 5, 1965    J. R. WETCH ETAL    3,164,525
COMPACT MOBILE NUCLEAR POWER PLANT
Filed May 4, 1960    6 Sheets-Sheet 1

INVENTOR.
JOSEPH R. WETCH
HERMAN M. DIECKAMP
BY  MONTE V. DAVIS

ATTORNEY

Jan. 5, 1965    J. R. WETCH ETAL    3,164,525
COMPACT MOBILE NUCLEAR POWER PLANT
Filed May 4, 1960    6 Sheets-Sheet 3

INVENTOR.
Joseph R. Wetch
Herman M. Dieckamp
Monte V. Davis
BY
ATTORNEY

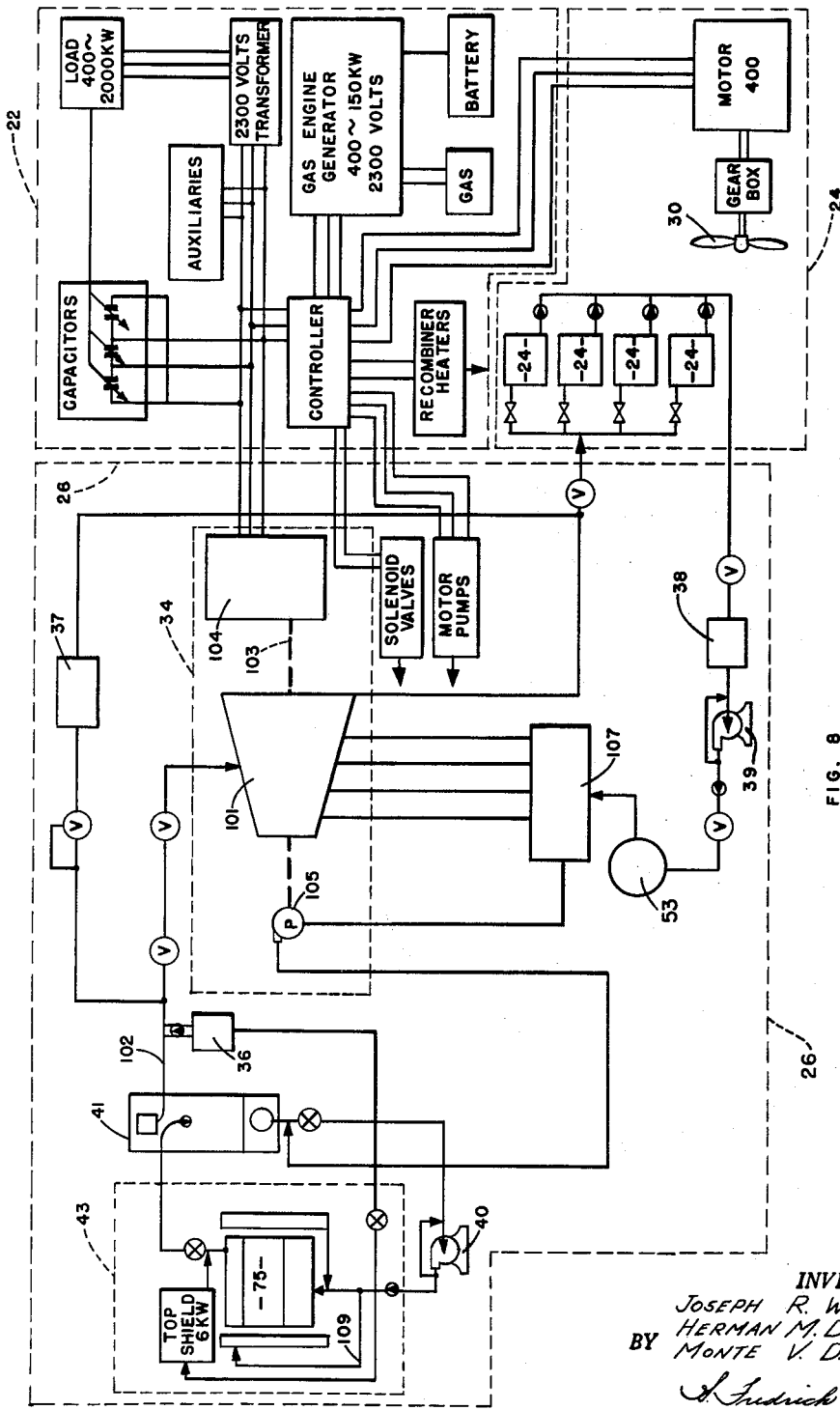

United States Patent Office 3,164,525
Patented Jan. 5, 1965

3,164,525
COMPACT MOBILE NUCLEAR POWER PLANT
Joseph R. Wetch, Woodland Hills, and Herman M. Dieckamp and Monte V. Davis, Canoga Park, Calif., assignors to North American Aviation, Inc.
Filed May 4, 1960, Ser. No. 26,903
20 Claims. (Cl. 176—33)

The present invention is directed to nuclear reactors and more particularly to compact boiling water nuclear reactor power-producing systems operating in the epithermal neutron energy range capable of mobility and long-life operation.

The need for a compact mobile power plant requiring a minimum of supervision and maximum reliability for use by the Armed Forces in remote locations has received considerable attention involving a large expenditure of funds in the quest for such a unit. The present state of the art in this segment of the nuclear reactor art and the problems and requirements for reactors of this type are shown in Nucleonics, vol 17, No. 2, February 1959, pages 46–60, where it is stated on page 48 that, "Compared with a water-cooled system, the highly enriched gas-cooled concept has the advantages of lighter weight, fewer components, and no need for an environmental water supply."

The present invention is directed to a zirconium hydride moderated, boiling-water-cooled reactor operating in the epithermal neutron energy range capable of producing, in the preferred embodiment, a net 2000 electrical kilowatt output, which may be mobile.

The compact mobile reactor of the present invention represents a substantial increase in power density and energy density while staying within very reasonable limits of peak metal burnup at relatively low fuel temperature. The gas-cooled and natural convection boiling-water-cooled reactors presently available are capable of only low power and energy density as compared to the APPR and fast reactor concepts. However, the latter have been pushed to nearly their limits and their performance rates below the boiling-water-cooled, zirconium hydride-uranium allow fueled and moderated reactor of the present invention. In addition, the fast reactor concept utilizes only about one percent of the contained uranium as compared to at least 20 percent utilization in the present epithermal reactor system. Thus, the fuel inventory must be an order of magnitude higher for the fast reactor for equivalent core endurance. Thus, the present invention provides an energy density of about 2000 (mw.-days/ft.$^3$) and an average power density of 10 (mw./ft.$^3$) as compared to 73 and 0.17 for the GCRE (Be mod.); 180 and 0.42 for the GCRE ($H_2O$ mod.); 220 and 0.3 for the ALPR; 240 and 1.42 for the VBWR; 500 and 0.4 for the EBWR; and 1220 and 2.22 for the APPR.

A comparison of the characteristic parameters for various boiling water reactors is shown in Table I.

TABLE I

*Comparison of Boiling Water Reactors*

| | EBWR | | VBWR | Dresden | CRBR | Elk River | Present Invention |
|---|---|---|---|---|---|---|---|
| | Experimental | Design | | | | | |
| $P_T$ (mw.) | 61.7 | 20 | 30 | 626 | 203 | 58 | 12 |
| $Q_{avg.}$ (mw./ft.$^3$) | 1.8 | 0.59 | 1.6 | 0.76 | 1.2 | 1.1 | 10 |
| $Q_{max.}$ (mw./ft.$^3$) | 5.5 | 1.8 | 3.5 | 2.76 | 3.0–3.6 | 3.7 | 15 |
| Peak/avg | 3.0 | 3.0 | 2.2 | 3.63 | 2.5–3.0 | 3.4 | 1.5 |
| $A_{HT}/V$ (ft.$^2$/ft.$^3$) | 44 | 44 | 54 | 27.3 | | 41.5 | 98.1 |
| Coolant fraction | 0.65 | 0.65 | 0.93 | 0.68 | | | 0.34 |
| $V_{in}$ (ft./sec.) | | 2.5 | 2.8 | 4.5 | | 4.1 | 8.8 |
| Exit quality | | 0.016 | 0.02 | 0.052 | | 0.036 | 0.10 |
| Recirculation ratio | | 62.5 | 50 | 19.2 | | 27.8 | 10 |
| $p$ (p.s.i.) | | 600 | 1,000 | 1,000 | 600 | 875 | 1,200 |
| $Q_{max.}$ million-Btu./hr.-ft.$^2$ | | 0.155 | 0.20 | 0.39 | 0.25 | 0.31 | 0.55 |
| $q_{bo}$ Design (est.) | | 0.76 | 0.8 | 1.01 | | 0.90 | 1.44 |
| $q_{bo}$ Current (calc.) | | 0.65 | 0.76 | 1.03 | | 0.92 | 1.44 |
| $q_{bo}$ (est.)/$Q_{max.}$ | 1.3 | 4.2 | 4.0 | 2.6 | | 2.9 | 2.6 |

A boiling water reactor must form a large quantity of steam in the core to extract a large quantity of heat. A small core, therefore, requires a high concentration of steam. Stability and control are difficult under these circumstances since the neutron moderation is all in the water. High steam quality leads to large random fluctuations in power level and excessive control requirements when large amounts of reactivity are invested in the water. In the present invention a fixed moderator is utilized so that relatively little reactivity effect is associated with random variations in coolant concentration since the moderator density is changing only a comparably insignificant amount.

A small steam concentration may be maintained by using large coolant recirculating flow, but excessive pumping requirements would result unless a large core utilizing wide coolant gap spacing were used to permit natural circulation such as in the EBWR, ALPR, and VBWR. In the present invention less than two percent of the reactor power is used to recirculate the coolant. In a fluid or boiling-water-moderated reactor it would be necessary to limit the exit steam quality to about two percent with a recirculation ratio of 50:1 as compared to the ten percent exit quality and 10:1 recirculation ratio of the present invention.

Therefore, it is the object of the present invention to provide a solid-moderated, boiling-water-cooled reactor with substantially increased energy and power densities.

Another object of the present invention is to provide a boiling water reactor with substantially reduced reactivity effect resulting from the void fraction.

Another object of the present invention is to provide a boiling water reactor having a small steam concentration in the core and a steam exit quality of at least about 10 percent with a 10:1 recirculation ratio.

It is a still further object of the present invention to provide a boiling water reactor utilizing a metal hydride moderator homogeneously containing fissionable material.

It is a still further object of the present invention to provide a boiling-water-cooled reactor with a solid moderator having a neutron energy spectrum in the epithermal range.

It is a still further object of the present invention to provide a boiling-water-cooled reactor with a solid moderator having a more uniform radial power distribution thereby increasing total core endurance and total reactor power.

It is a still further object of the present invention to provide a compact, mobile, hermetically sealed nuclear reactor capable of substantially long life and increased reliability.

It is still a further object of the present invention to provide a compact, mobile, hermetically sealed power-producing system utilizing a nuclear reactor which is capable of providing 2 mw.(e) (net) for a minimum full power core life of 5000 hours.

These and other objects of the present invention will be more apparent from the following detailed description and drawings, hereby made a part of the specification, in which:

FIGURE 8 shows the power plant cycle flow schematic.

Figure 1:
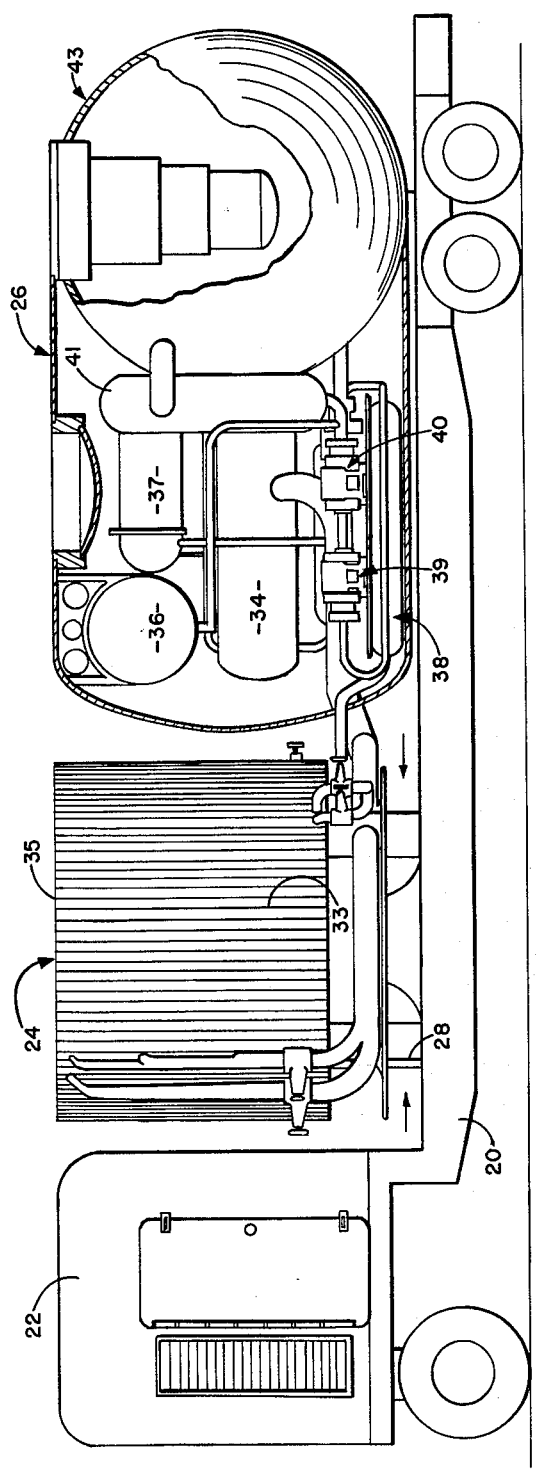
FIGURE 1 shows the compact power-producing facility of the present invention mounted upon a mobile trailer.
Figure 2:
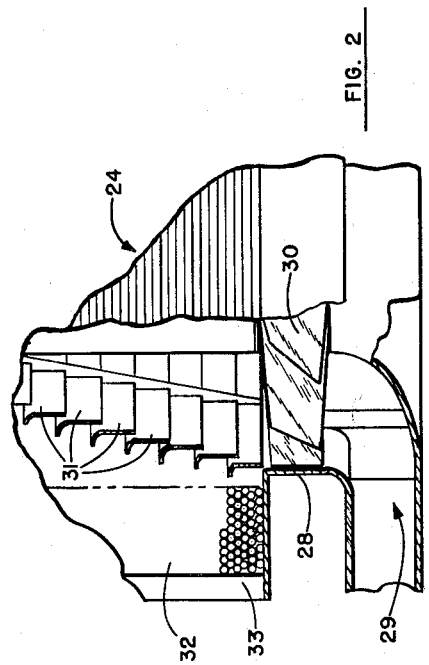
FIGURE 2 shows a detail sectional view of a part of the steam condenser.

Referring now to the drawings in detail, FIGURE 1 shows the general layout of the nuclear power plant of the present invention and consists of a trailer 20 supported by a plurality of wheels having an electrical equipment cubicle 22, an air-cooled steam condenser 24 located in the forward part of the trailer 20, and a containment vessel 26 located on the back part of the trailer 20. The air-cooled steam condenser 24 is mounted on supports 28 so that inlet ducts 29 and fan 30 (see FIGURE 2) may be mounted between the bed of trailer 20 and the bottom of steam condenser 24. The steam condenser consists of a plurality of vertically spaced cascade diffusers 31 of diminishing radius supported above the fan 30 and within a volume formed by a four quadrant condenser unit assembly 32. Each assembly 32 is connected through a header to the discharge of the turbine in the combined shaft unit 34. A series of vertical louvers 33 and a top cover 35 are also provided.

Within the containment vessel 26 are the accumulator tank 36, desuperheater 37, deionizer 38, low pressure feed pump 39, recirculating pump 40, separator 41, combined shaft unit 34, and reactor shield and pressure vessel indicated generally at 43. The containment vessel 26 is supported by a plurality of tank supports not shown.

Figure 3:
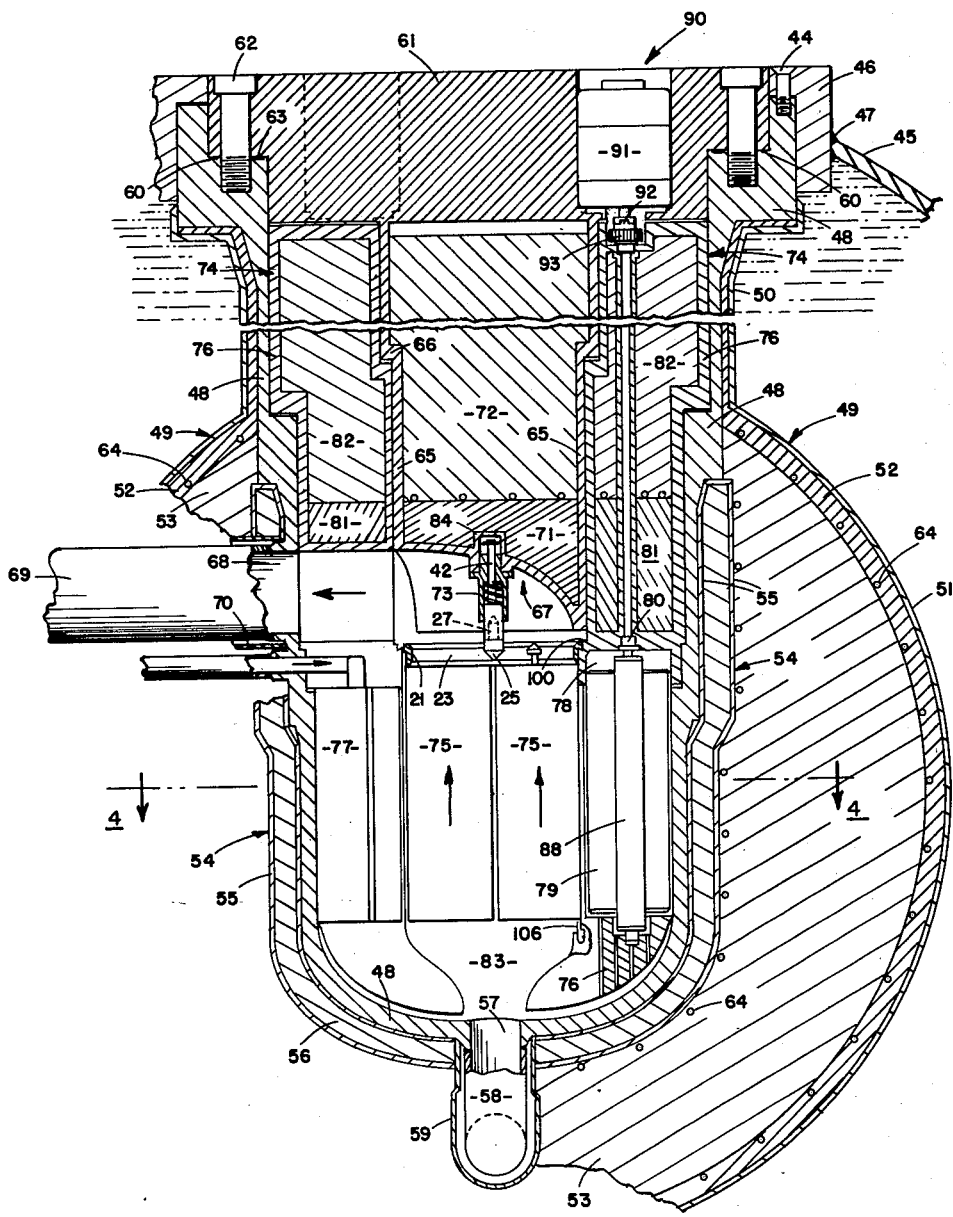
FIGURE 3 shows a sectional view of the reactor of the present invention.
Figure 4:
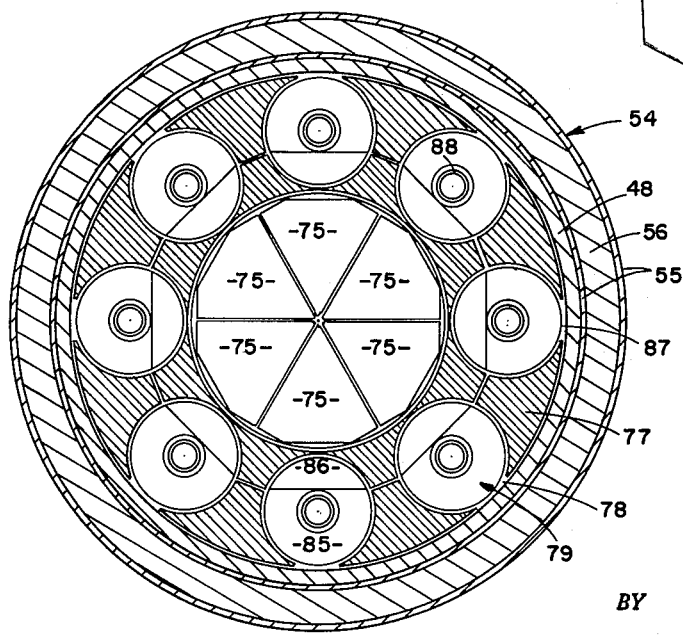
FIGURE 4 shows a section along lines 4—4 of FIGURE 3.

The reactor, shield and pressure vessel 43 are shown in detail in FIGURES 3 and 4 and consist of a steel spherical vessel 45 having a top opening in which a support flange 46 is sealed as by welding at 47. The support flange 46 has a plurality of holes 44 through which bolts depend to support the primary pressure vessel 48. A boron steel secondary vessel 49 is supported by braces (not shown) within the vessel 45 and is sealed to the upper flange of pressure vessel 48. Steel vessel 49 has an upper throat 50 and a spherical lower portion 51. Insulation 52 containing cooling coils separates the vessel 49 from vessel 48 and from the borated ZrH shield 53. The shield 53 has an outer spherical surface in contact with the insulation 52 and an inner cylindrical cavity into which the primary pressure vessel 48 is supported.

The lower portion of the vessel 48 is surrounded by a fast neutron shield 54 consisting of a boron steel cladding 55 covering a depleted uranium core 56. The inner surface of shield 53 adjacent cladding 55 of shield 54 is provided with cooling coils to reduce temperature gradients.

The bottom of the reactor vessel 48 is provided with a coolant (water) inlet 57 to which is welded coolant inlet pipe 58. The coolant pipe 58 is enclosed within a sleeve 59 which passes through shields 53 and 54 and the spherical vessel 45.

Supported upon a top flange 60 of vessel 48 is a shield plug 61 having a plurality of bolts 62 to maintain a pressure seal at the gasket 63 on flange 60. Extending downwardly from the center of shield 61 is a center section shield container 65 having a step 66 to prevent radiation streaming and a re-entrant coolant outlet directing surface 67 which directs the coolant from its longitudinal direction to a radial direction toward coolant outlet 68. The coolant outlet 68 is welded to outlet pipe 69 which is contained within a sealed sleeve 70.

Within the shield container 65 is a nickel reflector 71 located in the lower portion and a zirconium hydride (borated) top shield 72, containing cooling coils, filling the remainder of the container 65. The container 65 may be made in several pieces (not shown) to form a sealed chamber.

The core 75 is supported below the container 65 as explained in detail hereinafter. The annular volume between the container 65 and core and the pressure vessel 48 is occupied with an annular shield and reflector cylinder 74 having an outside casing 76 of stainless steel. Adjacent the core 75 is the reflector 77 composed of a concentric four-inch-thick nickel cylinder with a two-inch-thick hafnium hydride portion within the control drums 79 which surrounds the 12-inch diameter by 17-inch-long core 75. Within this cylindrical reflector assembly are bored the cylindrical cavities 78 for the eight control drums 79 (see FIGURE 4). The water lubricated bearing sockets 80 for the control drums 79 are machined into the reflector 77. The upper nickel portion 81 of the reflector assembly acts as a part of the top shield unit and is followed with a cylinder 82 of borated zirconium hydride. The lower reflector consists of nickel metal and the inlet water plenum 83. The complete radial reflector assembly, including control drums 79, can be removed as a unit. Thus, the reactor consists, in a radial direction from the core, of 4 inches of nickel with 2 inches of hafnium hydride or ZrH (borated) in the control cylinders, ¾ inch stainless steel, ¼ inch borated steel, 2 inches depleted uranium, ¼ inch borated steel, 12 to 16 inches of borated ZrH, and 20 to 27 inches of borated water.

The reactor control and shutdown is accomplished by eight rotating reflector drums 79 six inches in diameter and eighteen inches long. Each has a control range of about 160 degrees rotation amounting to about 2.6 percent reactivity. The drums are gang operated to minimize flux peaking in the hot clean condition. The drums are constructed of 4 inches of nickel 85 and 2 inches of hafnium hydride 86 or Boral, mechanically joined and protected from the cooling water surrounding them by a stainless steel can 87. The control drums are mounted on hollow shafts 88 through which cooling water circulates. These shafts, which are supported by water lubricated bearings 80 extend up through the upper shield 74 and 61 plug assembly to the actuator drive 90, which is sealed to shield 61. The drive consists, in the preferred embodiment, of a six-pole salient pole motor 91 connected to the extended end of the control drum by a slip-type flexible coupling 92. This coupling allows the removal and reassembly of the drive for maintenance without removal of the reactor top shield.

The stator consists of a ceramic insulated 3-phase canned unit with conventional distributed winding. When the 3-phase sinusoidal pulsating D.C. is applied to the stator, the salient pole rotor moves the control drum at the frequency and direction of the moving stator poles. This action is similar to that of a 3-phase synchro. When steady D.C. power is applied to the stator, its poles remain stationary, holding the rotor in a fixed position. The torque of the drive is balanced against the force of a spiral scram spring 93. Scram may be achieved by either electric power reversal of the pulsating D.C. phase rotation, or by mechanically de-energizing the stator.

The 1.25 cu. ft. volume of core 75 is capable of generating 12 mw. thermal power based upon a recirculation ratio of 10:1 and a core length-to-diameter ratio of 1.4:1.

Figure 5:
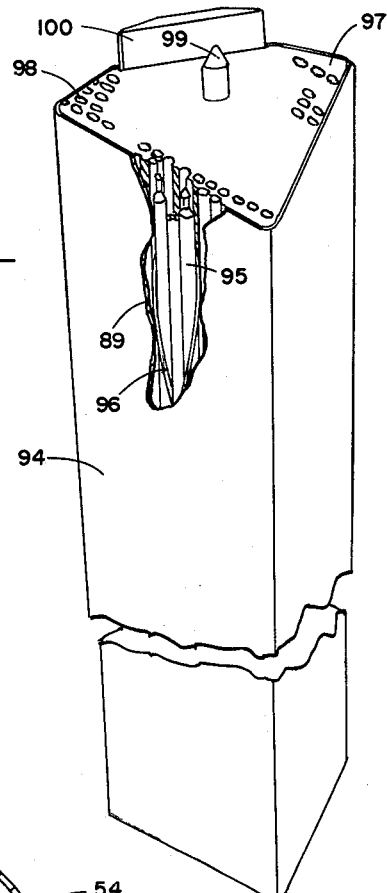
FIGURE 5 shows a perspective view of the fuel element of the present invention.

The core is composed of six prism-shaped sections 94 containing clusters of 159 individual triangularly pitched fuel rods or elements 95 (see FIGURE 5). Each fuel element 95 is $5/16$ inch in diameter and 17 inches long. The metal hydride fuel material is pressure bond clad with 0.010 inch of stainless steel; a 60 mil wire wrap 96 is utilized to maintain the desired flow channel clearance. The two rod ends of each fuel element 95 are extended into a top and bottom grid plate 97 of wedge shape. The grid plates 97 contain a plurality of coolant flow holes 98 and the top grid plate has a pick-up pin 99 and a top support extension 100. The assembled rods and grid plates are preferably contained in a welded 15 mil wall stainless steel can 89.

The top support extension 100 (see FIGURE 3) fits into a groove in the casing 76. A spider 21 has mating surfaces which fit against the inside of support extension 100 and prevent the fuel-containing, prism-shaped sectors 94 from moving upwardly. The spider 21 has a plurality of spokes 23 terminating in a hub 25 which has an extension 27 fitting into a spring loaded sleeve 42. Sleeve 42 is supported against lateral movement by tubular support 73 which fits into alignment fixture 84 in the coolant outlet directing surface 67 of shield container 65. In this manner the top shield is utilized as a fuel assembly hold-down. The bottom of each section 94 has a pin 106 which maintains the longitudinal axial alignment of the fuel sectors 94.

The preferred fuel composition is a zirconium hydride-uranium alloy. However, other hydrides having the same characteristics may be utilized. See Nucleonics, vol. 14, No. 11, pp. 146–153, November 1956, McCullough et al., entitled "Solid Metal Hydrides as Reactor Moderators."

The average effective core hydrogen density in the preferred zirconium hydride-uranium core is about $3 \times 10^{22}$ H atoms/cc. during full power operation. The initial core loading is 15 kg. of $U^{235}$ with a uniform uranium content of about 12.5 w/o in the alloy fuel moderator rod. The hydrogen content of the fuel rods is varied across the core radius fro mabout $2.4 \times 10^{22}$ H atoms/cc. at the center to about $5 \times 10^{22}$ H atoms/cc. at the periphery of the core. In this manner a more uniform radial power distribution (peak/average=about 1.1) can be achieved instead of about 1.3 which results from uniform hydrogen concentration. This preferred distribution of hydrogen will not only permit higher average core power density, but will achieve more uniform fuel burnup. This increase in fuel burnup will permit longer core life. The uranium content may vary over wide limits with the lower limit about 5 w/o enriched uranium.

Figure 6:
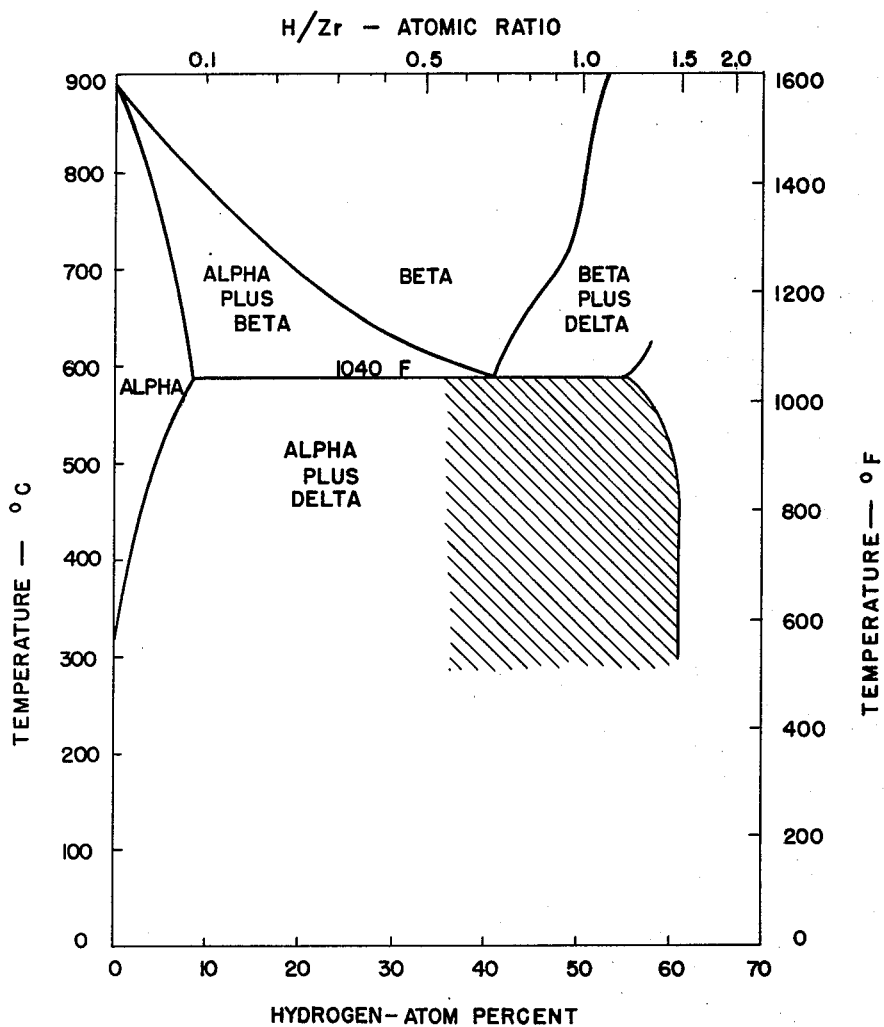
FIGURE 6 shows a phase diagram of zirconium hydride utilized in the present invention.

The alloy hydride behaves essentially as a mechanical mixture of zirconium hydride and uranium metal. The Zr-H phase diagram is shown in FIGURE 6. The fuel used in the present invention will operate up to about 550° C. (about 1000° F.) and preferably between about 300° C. and 500° C., and have a H/Zr ratio of about 0.6 to about 1.4 (from about 50 to less than about 60 a/o H). This places it in the hatched area of FIGURE 6 where the dissociation pressure is less than 11 microns at the fuel center temperature and about 0.01 micron at the fuel surface temperature, and is independent of composition since it is in a two-phase region (alpha+delta). Thus, the fuel for the present invention must be in the alpha-plus-delta phase region with a H/Zr atomic ratio of between about 0.6 to about 1.4 with the hottest portion of the fuel below about 1040° F. Structurally, the mixture is about 80 a/o $ZrH_{1.5}$ dispersed in 20 a/o alpha zirconium. In this region the disadvantages of the brittle delta phase are reduced. Further, the proposed fuel contains the same mixed phases in the same proportion from room temperature up to about 1050° F. Therefore, the problems of swelling on repeated thermal cycling, which is generally associated with crossing phase boundaries is eliminated. The lower limit of hydrogen concentration, i.e., about 40 a/o, is dictated by the extremely low limit of hydrogen solubility in alpha zirconium ($ZrH_x$, where $x$ is less than 0.1). Therefore, sufficient delta phase must be present so that sufficient hydrogen can be present in the zirconium hydride system.

TABLE II

*Core Characteristics*

| | |
|---|---|
| Core volume | 1.25 ft.$^3$. |
| Core diameter | 1.06 ft. |
| Fuel length | 1.4 ft. |
| Number of fuel rods | 954. |
| Fuel rod diameter | $5/16$ in. |
| Fuel density | 400 lb./ft.$^3$. |
| Fuel fraction | 56%. |
| Spacing between fuel rods | 0.060 in. |
| Cladding thickness | 0.010 in. |
| Stainless steel fraction | 10%. |
| Coolant fraction | 34%. |
| Uranium content | 15 kg. ($U^{235}$). |
| Zirconium content | 102 kg. |
| Hydrogen content | 1.2 kg. |
| Hydrogen density in fuel | $2.4$–$5.0 \times 10^{22}$ H atoms/cm.$^3$. |
| Effective hydrogen density in reactor (full power) | $3 \times 10^{22}$ H atoms/cm.$^3$. |
| Effective delayed neutron fraction | 0.0085. |
| Neutron generation time, $l$ | $8.5 \times 10^{-6}$ sec. |
| Prompt temperature coefficient | $-2 \times 10^{-5}$/° C. |
| Control and shutdown rod worth | 20% $\delta k/k$. |
| Heat transfer area | 111 ft.$^2$. |
| Thermal conductivity of fuel | 11 B.t.u./hr.-ft.$^2$.-° F. |
| Average heat flux | $0.37 \times 10^6$ B.t.u./hr.-ft.$^2$. |
| Maximum heat flux | $0.55 \times 10^6$ B.t.u./hr.-ft.$^2$. |
| Average coolant mass flow velocity | $1.59 \times 10^6$ lb./hr.-ft.$^2$. |
| Maximum vapor velocity | 24.9 ft./sec. |
| Flow area | 0.318 ft.$^2$. |
| Power generation | $39.6 \times 10^6$ B.t.u./hr. |
| Maximum fuel temperature | 920° F. |
| Maximum fuel surface temperature | 600° F. |
| Coolant boiling temperature | 570° F. |
| Inlet coolant temperature | 540° F. |
| Coolant pressure | 1226 p.s.i.a. |
| Boiling temperature | 570° F. (1225 p.s.i.a.). |
| Condensing temperature | 228° F. (20 p.s.i.a.). |
| Subcooled condensate temperature | 146° F. |
| Steam flow rate | 41,700 lb./hr. |
| Condenser flow rate | 33,800 lb./hr. |
| Steam extraction rate | 7,900 lb./hr. |

Figure 7:
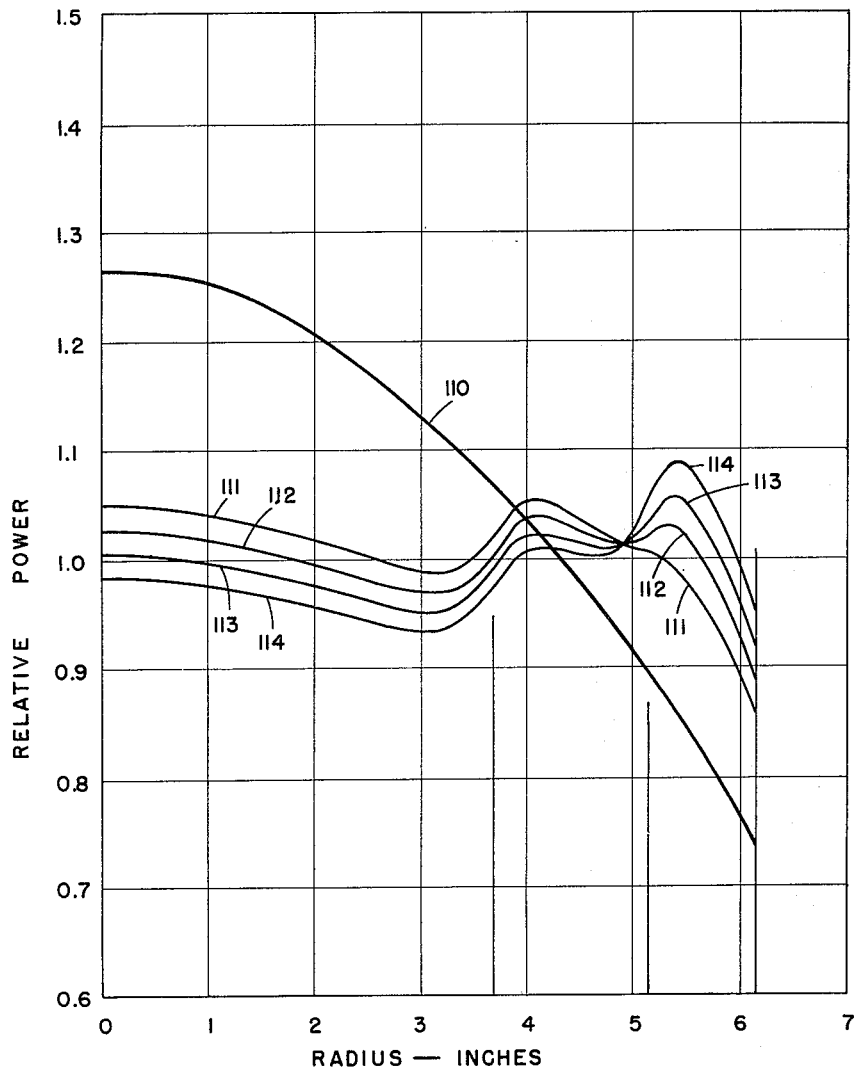
FIGURE 7 shows the relative radial power distribution for various hydrogen concentrations.

A total burnup of 3.1 kg. of $U^{235}$ is required for 5000 hr. core endurance. A fuel loading of 15 kg. will yield a uranium burnup of about 20 percent. This leads to a total reactivity savings of about 2.5 percent $\Delta k/k$ including long-term fission product poisons. This analysis is based upon a uniform hydrogen loading in the core of $3.1 \times 10^{22}$ H/cc. of core. The core composition volume fractions are: 56% fuel moderatorr rods; 10; stainless steel cladding and wire wrap; and 34/ coolant. Therefore, the average $N_H$ in the fuel rods would be about $2 \times 10^{22}$ H atoms/cc. of fuel. Due to this low average $N_H$ in the fuel, it is possible to vary $N_H$ in different radial regions of the core significantly before the limiting $N_H$ of $5.4 \times 10^{22}$ H atoms/cc. is exceeded. An $N_H$ of 5.4 is the transition between alpha-delta phase to delta phase hydride (see FIGURE 6). By increasing the hydrogen concentration toward the periphery of the core, a more uniform radial power distribution can be achieved with uniform radial fuel loading. In this manner, the total reactor power and total core endurance may be increased by reducing the radial peak-to-average power distribution. FIGURE 7 indicates the radial power variation, assuming all reflector drums are turned into the most reactive position, as a function of various hydrogen distributions. The core is arbitrarily separated into three equal volume regions for this illustration, although unequal volumes may be utilized.

TABLE III

| | Core hydrogen ratio | $N_H \times 10^{22}$ H atoms/cc. | | |
|---|---|---|---|---|
| | | Core (hot, avg.) | Fuel | Core (cold, avg.) |
| Region 1 | 1 | 2.42 | 2.36 | 3.62 |
| Region 2 | 1.25 | 3.02 | 3.43 | 4.22 |
| Region 3 | 1.6 | 3.86 | 4.93 | 5.06 |

The relative total region hydrogen atomic concentration in region one for curves 110–114 is 1.0; in region two it is 1.0 for curve 110 and 1.25 for curves 111–114; in region three it is 1.0, 1.4, 1.5, 1.6 and 1.7 for curves 110–114, respectively. It is apparent that a significant redistribution of radial power can be achieved by variations in the hydrogen content and that significantly increased core life will result. Curve 113 is the preferred distribution since the peak-to-average power ratio is only about 1.05.

The fuel temperature coefficient is $-2 \times 10^{-5}$ $\delta k/k$-° C. The total fuel reactivity decrease from cold to hot is less than 1% $\delta k/k$. The effect of fuel depletion is 1.6 $\delta k/k$, while the effect of fission product build-up is 0.9 $\delta k/k$, after 5000 hrs. operation.

A tabulation of reactivity changes during operation is as follows:

$\delta k/k$ percent
Cold clean flooded to hot clean full power _____ −11
Xenon poisoning at full power _____ − 2.7
Full temperature coefficient, cold to full power __ −1
Fuel depletion and fission product poisoning____ − 2.5

Total _____ −17.2

This swing may be minimized in a variety of ways. The fuel depletion and fission product swing may be reduced by utilizing burnable poisons in the fuel elements. The water swing can be reduced by utilizing burnable poisons, reducing fuel loading, and increasing the hydrogen concentration in the fuel rods. In this manner, the core would become more nearly thermalized. The rod spacing (0.060 in. in the preferred embodiment) may be reduced to as low as 0.030 in., thereby reducing the water swing to 8%. The change in reactivity due to water density change could be reduced by about 50% by using $D_2O$ as the boiling coolant.

The crystalline zirconium hydride-uranium fuel constitutes a quantum mechanical system with discrete energy levels for the bound proton. This quantum system results in an epithermal neutron spectrum with an average energy greater than about 0.1 ev. at room temperature. Under these conditions the prompt temperature coefficient of reactivity is $-2 \times 10^{-5}$/° C. from room temperature to operating temperature. The value increases significantly at temperatures above the operating temperature (700° F.) because of the coefficient of thermal expansion and because the bound hydrogen begins to behave more like free hydrogen at higher temperatures. This strong negative temperature coefficient is extremely prompt and significantly aids in stabilizing reactor operation.

The power conversion system of the present invention, shown in FIGURE 8, converts the 12,000 kw. of reactor thermal power into 2375 gross kw. of electrical power. From the heat output of the reactor the turbine generator converts 2680 kw. into mechanical shaft power, 9580 kw. being rejected to the air through the steam condenser and 580 kw. being extracted from the first four turbine stages as moisture to be reintroduced into the system through the regenerative heater.

The reactor core 75 operating at 1225 p.s.i.a. and 570° F. delivers 417,600 lb./hr. flow (10% quality). This flow is separated into the liquid and vapor phases in the steam separator 41. The liquid collects at the bottom of the separator tank and discharges through a level control orifice into the recirculation pump line. The condensate return flow is also mixed with the recirculating flow prior to being pumped through the core as explained below.

The separator 41 is conected in parallel with an accumulator 36 to provide shutdown emergency cooling and to aid in stabilizing load transient effects.

The line 102 delivers 1200 p.s.i.a. steam at the rate of 41,700 lb./hr. to turbine 101. The turbine 101 is within the combined shaft unit 34 and drives shaft 103 to which alternator 104 and high pressure feed pump 105 are connected. A steam desuperheater 37 is provided to aid in the condensation of superheated steam when it is by-passed around turbine 101 through a throttle valve. The majority of the steam passing through the turbine is expanded completely through the six-stage turbine. Through the first four stages, moisture is extracted, collected, and delivered to the regeneration heater 107. The turbine discharge steam vapor (25 p.s.i.a., 92% quality) is delivered through an emergency shutoff valve and out of the containment vessel to the four air-cooled steam condensers 24. The discharge steam enters the inlet header at the top of the condenser, flowing horizontally within finned tubes, and the condensate water is directed through the three pass section where it is subcooled to 148° F.

The condensate flow re-enters the secondary containment vessel through a second emergency shutoff valve from which it passes into the deionizer tank 38. The condensate flow is then admitted to the low pressure feed pump 39. The pump discharge is circulated in tubes through the combined water, zirconium hydride and uranium primary shield from which it removes heat. The shield, represented at 53, is shown in FIGURE 3 as including coolant coils 64 through which this condensate passes. The shield coolant discharge enters the regenerative heater 107 where it is heated to 215° F. by the turbine extract moisture (7900 lb./hr.). From the regenerative heater, the newly mixed flow combined with bearing and alternator cooling recirculatory flow enters the high pressure feed pump 105 where its pressure is increased to 1218 p.s.i.a. The discharge from pump 105 is mixed with the discharge of steam separator 41 and the combined water pumped by recirculating pump 40 into and through the reactor core except for a reflector cooling bypass 109.

The reactor is preferably operated at about 1200 p.s.i.a. although within the range of from about 1000 to 1500 p.s.i.a. the burnout flux is sufficiently high for safe operation. The electrical system diagrammatically shown in FIGURE 8 within the cubical 22 is standard equipment and therefore has not been described herein.

Although a particular embodiment of the present invention has been described, various modifications will be apparent to those skilled in the art. Therefore, the present invention is not limited to the specific embodiment disclosed but only by the appended claims.

What is claimed is:

1. A nuclear reactor comprising a vessel, a core within said vessel, means for passing water into said core, means for producing an epithermal neutron energy spectrum in said core and boiling said water, said last-named means including a plurality of fuel elements in said core containing a zirconium hydride and enriched uranium mixture, said zirconium hydride being in the alpha-plus-delta phase and having a hydrogen-to-zirconium ratio of from about 0.6 to about 1.4, a nickel reflector surrounding said core, control means in said reflector, and means for rotating said control means to effectuate reactor core control.

2. A nuclear reactor comprising a pressure vessel, a unitary annular reflector shield element supported within said vessel and adjacent the wall of said vessel, a core, means for supporting said core within and on said reflector and shield element, a top shield, said top shield having a downwardly extending central shield and reflector section, said section extending within said annular element to the top of said core, means connecting said section and said core for maintaining the axial position of said core, means for introducing water into said vessel below said core, means for withdrawing steam from above said core, means for boiling said water and for producing an epithermal neutron spectrum in said core, said last-named means including a plurality of fuel elements containing a zirconium hydride and uranium mixture, said zirconium hydride being in the alpha-plus-delta phase and having a hydrogen-to-zirconium ratio of from about 0.6 to about 1.4, a plurality of rotatable control means for controlling core reactivity supported within said unitary annular element and means located in said top shield and connected to said control elements for rotating said control elements.

3. A portable reactor power system comprising a platform, said platform supporting steam condenser means and a first closed vessel, said closed vessel containing steam-producing means and electricity-producing means connected to said steam-producing means, said steam condenser being connected to said electricity-producing means and said steam-producing means; a second closed vessel supported within said first closed vessel, said second closed vessel containing a pressure vessel; removable shielding means between said second closed vessel and said pressure vessel, said pressure vessel containing said steam-producing means comprising a water-cooled core having a plurality of fuel elements containing a solid moderator and a fissionable material; said electricity-producing means having turbine means, generator means and pump means connected by a single shaft, said pump means circulating said water from said steam condenser means to said core.

4. A nuclear reactor comprising a first vessel, a shield plug sealed to the top of said vessel, a core within said vessel, said core comprising a plurality of prism-shaped assemblies, each of said assemblies containing a plurality of fuel elements, each of said fuel elements containing a mixture of zirconium hydride and a fissionable material; means for pumping water into said assemblies; means for generating an epithermal neutron spectrum in said core and for boiling said water in said core including said plurality of fuel elements; a second vessel connected to said first vessel below said shield plug and spaced from the lower portion of said first vessel; shielding means between said first and second vessels; a third vessel connected to said first vessel adjacent said shield plug and spaced from said first and second vessels; and liquid radiation shielding means located between said second and third vessels.

5. A boiling water cooled nuclear reactor comprising a vessel, a core within said vessel; means for producing in said core an epithermal neutron energy spectrum and flattening the radial power distribution in said core, said means including a plurality of rod-shaped fuel elements in said core containing a mixture of zirconium hydride and enriched uranium, said hydrogen in said mixture having an increasing concentration along the core radius; means for pumping water into said core, said fuel elements generating sufficient heat to boil said water and generate steam in said core; and means adjacent said core for controlling said reactor.

6. A nuclear reactor comprising a vessel, a core within said vessel, water in said core; means in said core for producing an epithermal neutron energy spectrum and for boiling said water, said means including a plurality of fuel elements, each of said fuel elements containing a mixture of zirconium hydride and fissionable material, said zirconium hydride being in the alpha-plus-delta phase, the hydrogen content of said zirconium hydride being varied across the core radius from about $2.4 \times 10^{22}$ H atoms/cc. at the center to about $5 \times 10^{22}$ H atoms/cc. at the periphery of said core.

7. A nuclear reactor comprising a vessel, a core within said vessel, water in said core, means in said core for producing an epithermal neutron energy spectrum and for boiling said water, said means including a plurality of fuel elements, each of said fuel elements containing a mixture of zirconium hydride and fissionable material, said zirconium hydride being in the alpha-plus-delta phase, the hydrogen content of said zirconium hydride being varied across said core into a plurality of discrete regions wherein a central first region has a first concentration of hydrogen and concentric other regions have from 1.25 to 1.7 times said first concentrations.

8. A compact mobile boiling water cooled nuclear reactor comprising a vessel, a core within said vessel, said core comprising a plurality of prism-shaped assemblies removably supported within said vessel, each of said assemblies containing a plurality of spaced fuel elements, each of said fuel elements containing a mixture of zirconium hydride and a fissionable material; means for controlling said reactor including a plurality of rotatable control means located outside said core and within said vessel; and means for rotating said control means in ganged operation; means for passing water through said assemblies; means for generating an epithermal neutron spectrum and for boiling said water in said core including said plurality of fuel assemblies.

9. A compact mobile boiling water cooled nuclear reactor comprising a vessel, a core within said vessel, said core comprising a plurality of prism-shaped assemblies removably supported within said vessel, each of said assemblies containing a plurality of spaced fuel elements, each of said fuel elements containing a mixture of zirconium hydride and a fissionable material; means for passing water through said assemblies; means for generating an epithermal neutron spectrum and for boiling said water in said core including said plurality of fuel assemblies; reflector means outside of said core and surrounding said core on its top and sides; means located in said side reflector for controlling said reactor including a plurality of rotatable control means; means located above said top reflector and operatively connected to said controlling means for rotating said controlling means; and steam outlet means communicating with the top of said core and passing through said top reflector and the side of said vessel.

10. A compact mobile boiling water cooled nuclear reactor comprising a vessel, a core within said vessel, said core comprising a plurality of prism-shaped assemblies removably supported within said vessel, each of said assemblies containing a plurality of spaced fuel elements, each of said fuel elements containing a mixture of zirconium hydride and a fissionable material; reflector means substantially surrounding said core on its top and sides; means on each of said prism assemblies adapted to engage said side reflector means to support said assemblies in parallel axial alignment; and means resiliently connected to said top reflector adapted to engage the top of said assemblies for maintaining the longitudinal position of said assemblies within said core; means for passing water through said assemblies; and means generating an epithermal neutron spectrum and for boiling said water in said core including said plurality of fuel assemblies.

11. A compact mobile boiling water cooled nuclear reactor comprising in combination a vessel; a core within said vessel; a plurality of fuel elements in said core; means for removing heat from said fuel elements including means for pumping water into said core and into contact with said fuel elements, said fuel elements containing sufficient fissionable fuel to sustain a chain reaction and to generate sufficient heat to boil said water and generate steam in said core; means for controlling the reactivity of said core; means for minimizing the reactivity effects resulting from variations in the water concentration in said core due to said boiling, said last-named means including a solid metal hydride moderator in said fuel elements in a quantity sufficient to generate an epithermal neutron spectrum in said core; and means for directing said steam from said core and said vessel.

12. The boiling water cooled nuclear reactor of claim 11 wherein said means for controlling includes movable reflector elements located outside said core and within said vessel.

13. The reactor of claim 11 including means for flattening the radial power distribution in said core including a plurality of discrete radially spaced regions in said core, each of said regions containing a portion of said fuel elements, each of said fuel elements of one region having a different hydrogen content than the fuel elements of another region.

14. A compact mobile boiling water cooled nuclear reactor comprising in combination a first vessel; a core within said vessel; a plurality of fuel elements in said core; means for pumping water into said core for cooling said fuel elements, said fuel elements containing sufficient fissionable fuel to sustain a chain reaction and to generate sufficient heat to boil said water in said core and generate steam in said core; means for minimizing the reactivity effects resulting from variations in the water concentration due to said boiling, said last-named means including a solid metal hydride moderator mixed with said fissionable fuel in each of said fuel elements in a quantity sufficient to provide an epithermal neutron spectrum in said core; means for extracting steam directly from said core; means for controlling said chain reaction, said last-named means including rotatable reflector means located adjacent said core and inside said first vessel; said first vessel being supported within a second vessel; and removable shielding means between said first and second vessel.

15. A nuclear reactor comprising in combination a vessel; a core within said vessel; means for pumping water into said core and means for extracting steam from said vessel, said core including a plurality of fuel elements, each fuel element consisting essentially of a solid metal hydride moderator and fissionable fuel, said moderator being present in an amount sufficient to produce an epithermal neutron energy spectrum in said core, said fissionable fuel being present in an amount sufficient to sustain a chain reaction in said core and to boil said water in said core; a reflector surrounding said core within said vessel; and control means for controlling the reactivity of said core.

16. The nuclear reactor of claim 15 including in combination a hermetically sealed power producing system connected to said pumping means and said steam extraction means, and wherein said fuel elements are supported in a plurality of prism-shaped assemblies and each of said assemblies contains a plurality of spaced fuel elements.

17. The nuclear reactor of claim 15 wherein said means fro pumping water is connected to the bottom of said core and including reflector means substantially surrounding said core; and means on said reflector means for supporting said fuel elements in said core and against axial movement induced by said pumped water.

18. The nuclear reactor of claim 15 wherein the hydrogen content of said plurality of fuel elements is varied across said core in a plurality of discrete regions and including a first central region having a first concentration and at least one concentric outer region having an incrementally increasing hydrogen concentration.

19. A boiling water cooled nuclear reactor comprising in combination a vessel; a core within said vessel; means for producing in said core an epithermal neutron energy spectrum and for flattening the radial power distribution in said core, said means including a plurality of fuel elements in said core, each fuel element consisting essentially of a mixture of a solid metal hydride and fissionable fuel material, said core having an increasing hydrogen concentration along the core radius; means for pumping water into said core, said fuel elements containing sufficient fissionable material to sustain a chain reaction and to generate sufficient heat to boil said water and generate steam in said core; means for extracting steam from said core; and means adjacent said core including a plurality of rotatable reflector elements for effecting the control of said core.

20. A boiling water cooled nuclear reactor comprising a vessel; a core within said vessel; means including a plurality of fuel elements in said core for generating an epithermal neutron spectrum in said core, each of said elements containing a solid hydride moderator and a fissionable fuel mixture; means for removing heat from said fuel elements including means for pumping water into said core and into contact with said fuel elements, said fuel elements having a sufficiently high surface temperature to boil said water and generate steam in said core; and means for directng said steam from said core and said vessel; said fuel elements being in the form of clad rods, each of said fuel rods having a solid hydride moderator of zirconium hydride; a reflector surrounding said core; and rotatable control means in said reflector.

References Cited by the Examiner

UNITED STATES PATENTS

| | | | |
|---|---|---|---|
| 2,774,730 | 12/56 | Young | 176—43 |
| 2,809,157 | 10/57 | Metcalf | 176—54 |
| 2,852,458 | 9/58 | Dietrich et al. | 176—35 |
| 2,920,025 | 1/60 | Anderson | 176—65 |
| 2,936,273 | 5/60 | Untermeyer | 60—108 |
| 2,938,848 | 5/60 | Ladd et al. | 176—72 |
| 2,947,678 | 8/60 | Gimera et al. | 176—75 |
| 2,956,000 | 10/60 | Kendall et al. | 176—83 |

OTHER REFERENCES

Nucleonics, November 1956, pp. 151,152.

Proceedings of the Second United Nations International Conference on the Peaceful Uses of Atomic Energy, September 1–September 13, 1958, Geneva, vol. 10, pp. 282–286, 60–64.

Nucleonics, February, 1959, pp. 46–60.

Nuclear Fuel Elements, Henry Hausner et al., Reinhold Publ. Co., N.Y., 1959, pp. 79–93.

CARL D. QUARFORTH, *Primary Examiner.*

SAMUEL BOYD, LEON D. ROSDOL, ROGER L. CAMPBELL, REUBEN EPSTEIN, *Examiners.*